(12) United States Patent
Liu et al.

(10) Patent No.: US 11,872,625 B2
(45) Date of Patent: Jan. 16, 2024

(54) METHOD FOR ELIMINATING CRACKS IN RENÉ 104 NICKEL-BASED SUPERALLOY PREPARED BY LASER ADDITIVE MANUFACTURING

(71) Applicant: CENTRAL SOUTH UNIVERSITY, Hunan (CN)

(72) Inventors: Zuming Liu, Hunan (CN); Kai Peng, Hunan (CN); Xueqian Lv, Hunan (CN); Fan Zhao, Hunan (CN); Quan Li, Hunan (CN); Bing Wei, Hunan (CN)

(73) Assignee: CENTRAL SOUTH UNIVERSITY, Hunan (CN)

( * ) Notice: Subject to any disclaimer, the term of this patent is extended or adjusted under 35 U.S.C. 154(b) by 630 days.

(21) Appl. No.: 17/254,303

(22) PCT Filed: Aug. 30, 2018

(86) PCT No.: PCT/CN2018/103322
§ 371 (c)(1),
(2) Date: Dec. 21, 2020

(87) PCT Pub. No.: WO2020/019404
PCT Pub. Date: Jan. 30, 2020

(65) Prior Publication Data
US 2021/0170487 A1 Jun. 10, 2021

(30) Foreign Application Priority Data
Jul. 27, 2018 (CN) .......................... 201810846786.7

(51) Int. Cl.
*B22F 10/28* (2021.01)
*B22F 3/24* (2006.01)
(Continued)

(52) U.S. Cl.
CPC .............. *B22F 10/28* (2021.01); *B22F 1/052* (2022.01); *B22F 3/24* (2013.01); *B22F 10/36* (2021.01);
(Continued)

(58) Field of Classification Search
CPC ...... B22F 2999/00; B22F 1/052; B22F 10/64; B22F 2003/248; B22F 2003/1051;
(Continued)

(56) References Cited

FOREIGN PATENT DOCUMENTS

| CN | 104785778 | 7/2015 |
|---|---|---|
| CN | 106825568 | 6/2017 |

(Continued)

OTHER PUBLICATIONS

"International Search Report (Form PCT/ISA/210) of PCT/CN2018/103322," dated Apr. 12, 2019, with English translation thereof, pp. 1-4.

*Primary Examiner* — Robert G Bachner
(74) *Attorney, Agent, or Firm* — JCIPRNET

(57) ABSTRACT

The present disclosure relates to the field of additive manufacturing and superalloys, particularly to a method for eliminating cracks in René 104 nickel-based superalloy prepared by laser additive manufacturing. For solving the problem that cracks are easily generated during laser additive manufacturing of René 104 nickel-based superalloy with high content of Al and Ti (Al+Ti>5 wt. %), generation of large-size cracks inside a fabricated part is suppressed by means of designing laser forming parameters and a partition scanning strategy; then stress relief annealing is performed to completely eliminate residual stress inside the fabricated part; and a spark plasma sintering process is performed to eliminate cracks inside the fabricated part and suppress the growth of grains during the sintering process.

10 Claims, 3 Drawing Sheets

(51) Int. Cl.
*B22F 10/36* (2021.01)
*B22F 10/366* (2021.01)
*B22F 10/38* (2021.01)
*B22F 10/64* (2021.01)
*B22F 1/052* (2022.01)
*B33Y 10/00* (2015.01)
*B33Y 40/20* (2020.01)
*B22F 3/105* (2006.01)
*B22F 12/17* (2021.01)
*B22F 10/32* (2021.01)

(52) U.S. Cl.
CPC ............ *B22F 10/366* (2021.01); *B22F 10/38* (2021.01); *B22F 10/64* (2021.01); *B22F 10/32* (2021.01); *B22F 12/17* (2021.01); *B22F 2003/1051* (2013.01); *B22F 2003/248* (2013.01); *B22F 2301/15* (2013.01); *B22F 2304/10* (2013.01); *B33Y 10/00* (2014.12); *B33Y 40/20* (2020.01)

(58) Field of Classification Search
CPC .. B22F 2998/10; B22F 10/28; B22F 2201/02; B22F 2201/11; B22F 2203/11; B22F 2203/13; C22C 1/0433
See application file for complete search history.

(56) References Cited

FOREIGN PATENT DOCUMENTS

| | | |
|---|---|---|
| CN | 107790720 | 3/2018 |
| CN | 107971491 | 5/2018 |
| FR | 3030321 | 6/2016 |

METHOD FOR ELIMINATING CRACKS IN RENÉ 104 NICKEL-BASED SUPERALLOY PREPARED BY LASER ADDITIVE MANUFACTURING

CROSS-REFERENCE TO RELATED APPLICATION

This application is a 371 of international application of PCT application serial no. PCT/CN2018/103322, filed on Aug. 30, 2018, which claims the priority benefit of China application no. 201810846786.7, filed on Jul. 27, 2018. The entirety of each of the above mentioned patent applications is hereby incorporated by reference herein and made a part of this specification.

BACKGROUND

Technical Field

The present disclosure relates to a method for eliminating cracks in René 104 nickel-based superalloy prepared by laser additive manufacturing, and belongs to the field of additive manufacturing and superalloys.

Description of Related Art

Nickel-based superalloys can retain excellent yield resistance, fatigue resistance, creep resistance, and corrosion resistance at 600° C. or above, and are widely applied in aerospace, energy and power, transportation and nuclear power industries, especially in hot-end components of aero-engine, rocket engine and gas turbine. Nickel-based superalloys contain a large amount of refractory alloying elements, which leads to the difficulties in powder forming and deformation processing, troublesome manufacturing process, and complicated process, especially the preparation of parts with complex shape, which seriously restricts the application of nickel-based superalloys.

Laser additive manufacturing technology, or called laser 3D printing, uses laser as a heat source to melt metal powder to stack layer by layer, can fabricate objects with any geometric shape. It has unique advantages in the preparation of nickel-based superalloy components with complex shape. However, the large thermal gradient and repeated remelting during laser additive manufacturing result in high residual stress in the fabricated part, which in turn leads to cracks. In particular, nickel-based superalloys with high Al and Ti content and poor welding performance are prone to cracking during the laser additive manufacturing process, which seriously degrades the mechanical properties of the fabricated part. Therefore, how to prevent the cracking of nickel-based superalloy during laser additive manufacturing has become the key to the application of the nickel-based superalloy prepared by laser additive manufacturing.

In view of the above problems, exploratory research has been carried out. Chinese Patent No. CN104785778A discloses a laser additive manufacturing technology of superalloy parts, which used a high-power laser beam to melt and accumulate superalloy powder layer by layer according to the pre-planned scanning path to manufacture superalloy parts. During the laser additive manufacturing process, a stress control method was adopted. To be specific, an ultrasonic stress relief technology was introduced in the laser additive manufacturing process to prevent the problems such as deformation and cracking of the parts prepared by laser additive manufacturing. Chinese Patent No. CN107971491A discloses a method for eliminating microcracks in nickel-based superalloy prepared by selective electron beam melting, in which the nickel-based superalloy prepared by additive manufacturing was treated by hot isostatic pressing (HIP), solution treatment and aging treatment, in turn to obtain a compact microcrack-free nickel-based superalloy. The parameters for the HIP process include a temperature of 1220° C.-1230° C., which was higher than the recrystallization temperature, and a time of 2-4 hrs.

The present disclosure, for the first time, attempts to combine the control of additive manufacturing parameters with stress relief annealing and spark plasma sintering (SPS), to obtain a product with no cracks (including internal and surface cracks) and having significantly improved mechanical properties.

SUMMARY

Technical Problem

The present disclosure provides a method for eliminating cracks in René 104 nickel-based superalloy prepared by laser additive manufacturing. By means of the control of additive manufacturing parameters in combination with stress relief annealing and SPS, the method can effectively eliminate cracks in René 104 nickel-based superalloy, especially prevent the formation of cracks during fabrication of nickel-based superalloys with high Al and Ti content and poor welding performance, thus improve the mechanical properties of the fabricated part.

According to the present disclosure, a method for eliminating cracks in René 104 nickel-based superalloy prepared by laser additive manufacturing, a stripe partition and chessboard partition scanning strategies are designed. The synergistic effect of the scanning strategy and process parameters reduces the generation and accumulation of residual stress during the fabrication process, and inhibits the formation of large cracks. Then, the fabricated part is subjected to post-treatment by stress relief annealing and SPS, the internal cracks of the fabricated part are eliminated and the mechanical properties of the product are greatly improved.

According to the present disclosure, a method for eliminating cracks in René 104 nickel-based superalloy prepared by laser additive manufacturing comprises the following steps:

(1) Preparation before laser additive manufacturing, comprising

According to the shape of a required part, designing a three-dimensional (3D) model of the part using 3D design software, then importing the 3D model into laser additive manufacturing equipment. After auto-slicing by the software, importing the data of each slice layer into the laser additive manufacturing system.

(2) Additive manufacturing by selective laser melting (SLM), comprising

Firstly, laying the René 104 nickel-based superalloy powder, then selectively melting the powder bed by laser according to the information of above slice layer, where the scanning methods include contour scanning and solid scanning; and for scanning of each layer, contour scanning is carried out first, then the solid scanning is carried out, where the solid scanning adopts the partition scanning strategy, and then contour scanning is carried out again. The whole step consists of powder laying and laser melting processing.

The René 104 nickel-based superalloy powder has a particle size of 15-53 µm, a $D_{10}$ of 15-20 µm, a $D_{50}$ of 25-31 µm, and a $D_{90}$ of 40-48 µm.

The parameters of the contour scanning are as follows: a laser spot diameter of 0.08-0.1 mm, a laser power of 100 W-150 W, and a scanning speed of 1000-1400 mm/s.

The parameters of the solid scanning are as follows: a laser power of 200 W-250 W, a laser spot diameter of 0.10-0.13 mm, a scanning speed of 450-650 mm/s, a scanning pitch of 0.08-0.14 mm, and a thickness of the laid powder layer being 30-35 µm.

The partition scanning strategy is as follows: dividing the solid area of each slice layer into multiple zones, and then scanning and melting every zone by laser in turn; and the partition scanning strategy includes a stripe scanning strategy and/or a chessboard scanning strategy.

Where the parameters for the stripe scanning strategy are as follows: a stripe width of 6-8 mm, and an overlap between stripes being 0.1-0.15 mm.

Where the parameters for the chessboard scanning strategy are as follows: a chessboard size of 4-6 mm, an overlap between chessboards being 0.08-0.12 mm, and laser scanning directions of adjacent chessboards being perpendicular to each other.

(3) Repeating step (2) until the whole part is printed on a substrate, and then separating the printed part from the substrate to obtain a fabricated part.

(4) Treating the fabricated part by stress relief annealing at a temperature of $(0.3-0.4)$ $T_{re}$° C. for a time of 1-3 hrs.

(5) Subjecting the fabricated part treated by the stress relief annealing to SPS at a temperature of $(0.8-0.9)$ $T_{re}$° C. for a time of 10-20 min.

Where the $T_{re}$ is the recrystallization temperature of the alloy, expressed in ° C. The $T_{re}$ of René 104 nickel-based superalloy is 1180° C.

According to the present disclosure, in a method for eliminating cracks in René 104 nickel-based superalloy prepared by laser additive manufacturing, the René 104 nickel-based superalloy contains Al and Ti, and (Al+Ti) is present in an amount of 5 wt. % or more based on the total weight of the René 104 nickel-based superalloy.

According to the present disclosure, in a method for eliminating cracks in René 104 nickel-based superalloy prepared by laser additive manufacturing, the substrate for printing is a stainless steel substrate or the same type of nickel-based superalloy. Before printing, the substrate is preheated to a temperature of 100-200° C.

According to present disclosure, in a method for eliminating cracks in René 104 nickel-based superalloy prepared by laser additive manufacturing, during the laser additive manufacturing process, inert protective gas such as argon or nitrogen needs to be introduced into the working chamber of the equipment to ensure an oxygen content in the working chamber less than 0.1%.

According to the present disclosure, in a method for eliminating cracks in René 104 nickel-based superalloy prepared by laser additive manufacturing, the stress relief annealing is carried out under a protective gas atmosphere. During the stress relief annealing, the temperature is raised to the annealing temperature at a heating rate of 5-15° C./min, preferably 8-12° C./min, and held for 1-3 hrs. Then the alloy is cooled within the furnace.

According to the present disclosure, in a method for eliminating cracks in René 104 nickel-based superalloy prepared by laser additive manufacturing, during the stress relief annealing, the protective gas atmosphere is selected from at least one of argon and nitrogen.

According to the present disclosure, in a method for eliminating cracks in René 104 nickel-based superalloy prepared by laser additive manufacturing, during SPS, the heating rate is controlled to 50-100° C./min, and the cooling rate is controlled to 50-100° C./min.

According to the present disclosure, in a method for eliminating cracks in René 104 nickel-based superalloy prepared by laser additive manufacturing, during SPS, the pressure is controlled to 30-50 MPa. As an optimization, during SPS, the sintering temperature is controlled to be 1020° C. or less.

According to the present disclosure, in a method for eliminating cracks in René 104 nickel-based superalloy prepared by laser additive manufacturing, after treatments of the stress relief annealing and SPS in turn, the tensile strength of the SLM-fabricated sample of the René 104 nickel-based superalloy is 1.6-2.0 times of that before the treatments.

According to the present disclosure, in a method for eliminating cracks in René 104 nickel-based superalloy prepared by laser additive manufacturing, the internal cracks in the fabricated part are effectively eliminated by the low-temperature, long-time, and high-pressure SPS process, and the original grain size inside the fabricated part is maintained, thus solving the problem of grain growth of the fabricated part when the cracks are eliminated by post-treatment. The synergistic effect of annealing parameters and SPS parameters makes it possible to obtain a fabricated part with uniform microstructure, no cracks and excellent mechanical properties.

According to the present disclosure, in a method for eliminating cracks in René 104 nickel-based superalloy prepared by laser additive manufacturing, a graphite mold is used during SPS, and the diameter is adjusted according to actual demands. The present disclosure can also be used for processing parts of irregular shapes, as long as the mold is filled with a conductive powder that does not react with the substrate before SPS.

Beneficial Effects of the Present Disclosure (1) In the method for eliminating cracks in René 104 nickel-based superalloy prepared by laser additive manufacturing of the present disclosure, stripe and chessboard scanning strategies are designed for nickel-based superalloys with high Al and Ti content and poor welding performance. The collaboration of the scanning strategy and process parameters effectively controls the generation and accumulation of residual stress, and inhibits the formation of large cracks during the alloy fabrication process. Then the residual stress in the fabricated part is completely eliminated by stress relief annealing. The internal cracks in the fabricated part are eliminated by metallurgical bonding of cracks by SPS under the collaboration of pressure and spark, thereby inhibiting the grain growth during the sintering process.

(2) In the method for eliminating cracks in René 104 nickel-based superalloy prepared by laser additive manufacturing of the present disclosure, stripe and chessboard scanning strategies are designed, the length of the laser scanning line is adjusted, and the generation of residual stress is effectively controlled.

(3) In the method for eliminating cracks in René 104 nickel-based superalloy prepared by laser additive manufacturing of the present disclosure, the parameters for laser additive manufacturing of nickel-based superalloy are designed, and the flatness of the surface and the uniformity of internal microstructures of the fabricated part are improved through the collaboration of the laser power, laser scanning speed, scanning pitch and other parameters.

(4) In the method for eliminating cracks in René 104 nickel-based superalloy prepared by laser additive manufacturing of the present disclosure, the collaboration of process parameters and the scanning strategy not only ensures the quality of the fabricated part, but also controls the generation and accumulation of residual stress during laser additive manufacturing process, thereby effectively inhibiting the formation of large cracks during laser additive manufacturing.

(5) In the method for eliminating cracks in René 104 nickel-based superalloy prepared by laser additive manufacturing of the present disclosure, the internal residual stress is eliminated by stress relief annealing, to prevent the deformation and cracking of the fabricated part caused by residual stress.

(6) In the method for eliminating cracks in René 104 nickel-based superalloy prepared by laser additive manufacturing of the present disclosure, the local deformation and atom migration at sites of defect such as cracks are promoted by SPS through the collaboration of high temperature and high pressure to achieve the metallurgical bonding of cracks, thereby eliminating the cracks and effectively preventing the grain growth.

(7) In the method for eliminating cracks in René 104 nickel-based superalloy prepared by laser additive manufacturing of the present disclosure, cracks in the nickel-based superalloys with high Al and Ti content and poor welding performance prepared by laser additive manufacturing are effectively eliminated. For the René 104 alloy prepared by the method of the present disclosure, no cracks are observed in the fabricated part, and the tensile strength at room temperature can reach 1300 MPa or more.

In summary, according to the method for eliminating cracks in René 104 nickel-based superalloy prepared by laser additive manufacturing of the present disclosure, to solve the problem that the nickel-based superalloys with high Al and Ti content are prone to cracking during laser additive manufacturing, the laser process parameters and a partition scanning strategy are designed to inhibit the formation of large cracks in the fabricated part. Then, stress relief annealing and SPS are used to eliminate small cracks in the fabricated part. For the René 104 nickel-based superalloy with high Al and Ti content prepared by this method, no cracks are observed in the fabricated part, and the tensile strength at room temperature can reach 1300 MPa or more.

DESCRIPTION OF THE EMBODIMENTS

The present disclosure will be further described below with reference to the accompanying drawings and specific embodiments.

Example 1

3D design software and 3D drawing software were used to construct a 3D cylinder model with a diameter of 40 mm and a height of 15 mm, which was converted into an STL file and imported into SLM building software. The model was auto-sliced by the software and imported into an SLM printing system. After heating the substrate to 150° C., the René 104 nickel-based superalloy powder was added to a powder supply tank and then laid. Argon was introduced into the working chamber until the oxygen content was less than 0.1%. Then the printing procedure was carried out, and the steps of laying the powder and scanning the powder by laser were repeated until the printing was completed to obtain a cylinder. Afterwards, the printed cylinder was treated by stress relief annealing and SPS in turn.

The René 104 nickel-based superalloy powder has a particle size of 15-53 μm, a $D_{10}$ of 17.5 μm, a $D_{50}$ of 29.3 μm, and a $D_{90}$ of 46.9 μm.

The process parameters for SLM are as follows: a laser power of 250 W, a spot diameter of 0.12 mm, a scanning speed of 500 mm/s, a scanning pitch of 0.12 mm, and a thickness of the laid powder layer being 0.03 mm.

Figure 1:
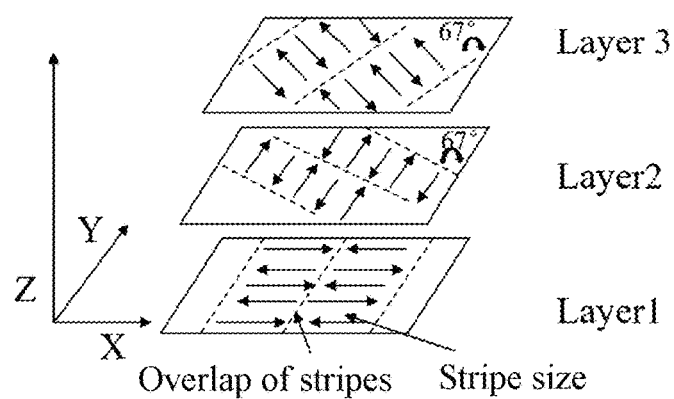
FIG. 1 is a schematic diagram of a stripe scanning strategy used in Example 1.

The scanning strategy for SLM is a stripe scanning strategy, as shown in FIG. 1. In the stripe scanning strategy, a layer-by-layer scanning method from bottom to top is adopted, the laser scanning direction is rotated by 67° between adjacent layers, the stripe width is 7 mm, and the overlap between stripes is 0.11 mm.

The stress relief annealing parameters are as follows: a temperature of 420° C. held for 90 min, and cooling within the furnace.

The SPS parameters are as follows: a graphite mold has a diameter of 40 mm, a heating rate of 60° C./min, a cooling rate of 60° C./min, a sintering pressure of 45 MPa, and a sintering temperature of 1020° C. held for 15 min.

Stress relief annealing and SPS are collectively referred to as post-treatment.

Before and after post-treatments of the fabricated parts, the densities are 99.18% and 99.55%, respectively, and the mechanical properties at room temperature are 987 MPa and 1376 MPa.

Figure 2:
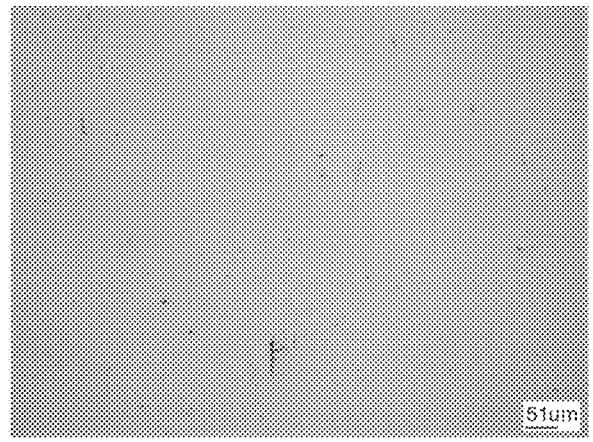
FIG. 2 shows the crack morphology in an SLM-fabricated René 104 alloy in Example 1.
Figure 3:
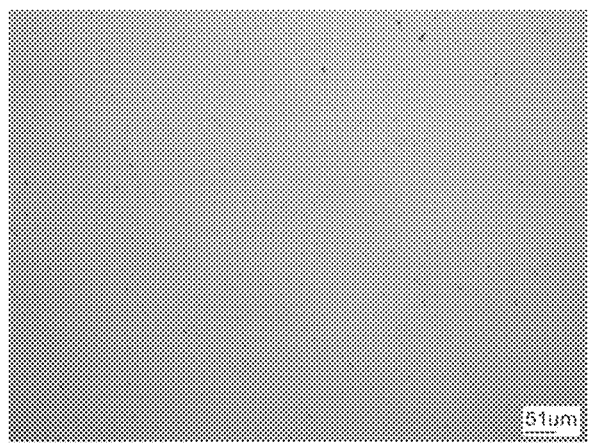
FIG. 3 shows the internal micro-structures in the SLM-fabricated René 104 alloy after post-treatments in Example 1, in which no cracks are observed.

The results shown in FIG. 2 show that the internal cracks in the fabricated parts are small and no large cracks are observed. The results shown in FIG. 3 indicate that there are no cracks in the post-treated fabricated parts.

Example 2

3D design software and 3D drawing software were used to construct a 3D cylinder model with a diameter of 40 mm and a height of 15 mm, which was converted into an STL file and imported into SLM building software. The model was auto-sliced by the software and imported into an SLM printing system. After heating the substrate to 150° C., the René 104 nickel-based superalloy powder was added to a powder supply tank and then laid. Argon was introduced into the working chamber until the oxygen content was less than 0.1%. Then the printing procedure was carried out, and the steps of laying the powder and scanning the powder by laser were repeated until the printing was completed to obtain a cylinder.

The René 104 nickel-based superalloy powder has a particle size of 15-53 μm, a $D_{10}$ of 17.5 μm, a $D_{50}$ of 29.3 μm, and a $D_{90}$ of 46.9 μm.

The process parameters for SLM are as follows: a laser power of 225 W, a spot diameter of 0.12 mm, a scanning speed of 600 mm/s, a scanning pitch of 0.11 mm, and a thickness of the laid powder layer being 0.03 mm.

Figure 4:
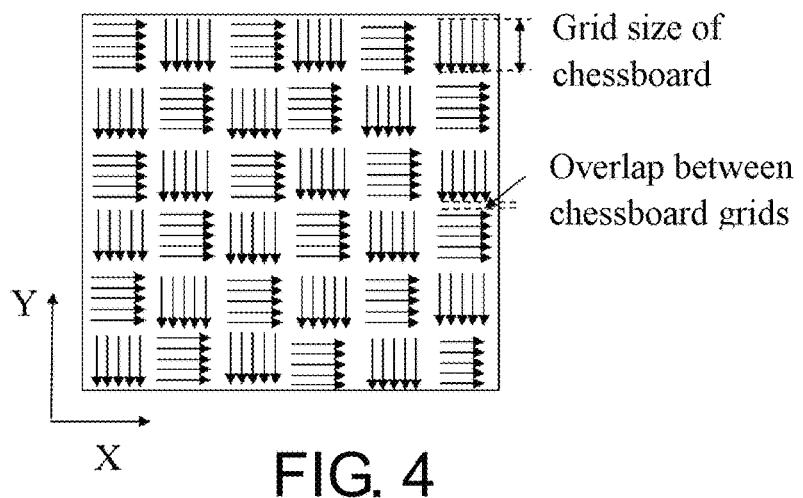
FIG. 4 is a schematic diagram of a chessboard scanning strategy used in Example 2.

The scanning strategy for SLM is a chessboard scanning strategy, as shown in FIG. 4. In the chessboard scanning strategy, a layer-by-layer scanning method from bottom to top is adopted, the laser scanning direction is rotated by 67° between adjacent layers, the grid size of the chessboard is 5 mm, the spacing between chessboard grids is 0.09 mm, and the laser scanning directions of adjacent chessboard grids are perpendicular to each other.

The stress relief annealing parameters are as follows: a temperature of 420° C. held for 90 min, and cooling within the furnace.

The SPS parameters are as follows: a graphite mold with a diameter of 40 mm, a heating rate of 60° C./min, a cooling rate of 60° C./min, a sintering pressure of 45 MPa, and a sintering temperature of 1020° C. held for 15 min.

Before and after post-treatments of the fabricated parts, the densities are 99.14% and 99.51%, respectively, and the mechanical properties at room temperature are 934 MPa and 1366 MPa.

Figure 5:
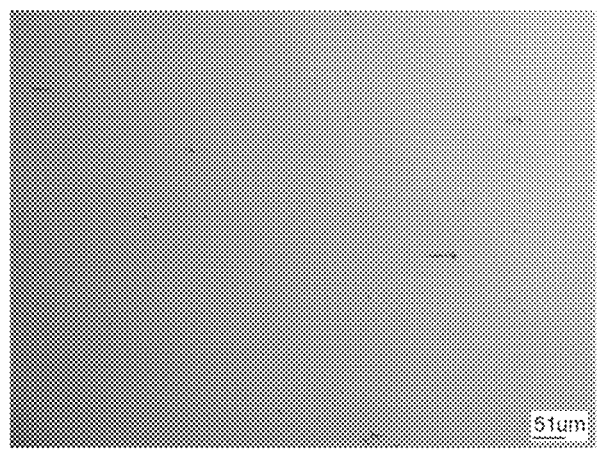
FIG. 5 shows the crack morphology in an SLM-fabricated René 104 alloy in Example 2.
Figure 6:
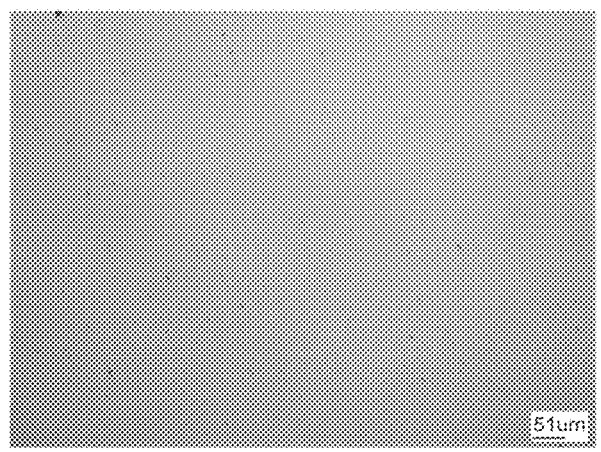
FIG. 6 shows the internal micro-structures in the SLM-fabricated René 104 alloy after post-treatments in Example 2, in which no cracks are observed.

The results shown in FIG. 5 show that the internal cracks in the fabricated parts are small and no large cracks are observed. The results shown in FIG. 6 indicate that there are no cracks in the post-treated fabricated parts.

Comparative Example 1

3D design software and 3D drawing software were used to construct a 3D cylinder model with a diameter of 40 mm and a height of 15 mm, which was converted into an STL file and imported into SLM building software. The model was auto-sliced by the software and imported into an SLM printing system. After heating the substrate to 150° C., the René 104 nickel-based superalloy powder was added to a powder supply tank and then laid. Argon was introduced into the working chamber until the oxygen content was less than 0.1%. Then the printing procedure was carried out, and the steps of laying the powder and scanning the powder by laser were repeated until the printing was completed to obtain a cylinder.

The René 104 nickel-based superalloy powder has a particle size of 15-53 μm, a $D_{10}$ of 17.5 μm, a $D_{50}$ of 29.3 μm, and a $D_{90}$ of 46.9 μm.

The process parameters for SLM are as follows: a laser power of 225 W, a spot diameter of 0.12 mm, a scanning speed of 600 mm/s, a scanning pitch of 0.11 mm, and a thickness of the laid powder layer being 0.03 mm. (The partition scanning strategy is not adopted)

The stress relief annealing parameters are as follows: a temperature of 420° C. held for 90 min, and cooling within the furnace.

The SPS parameters are as follows: a graphite mold with a diameter of 40 mm, a heating rate of 60° C./min, a cooling rate of 60° C./min, a sintering pressure of 45 MPa, and a sintering temperature of 1020° C. held for 15 min.

Before and after post-treatments of the fabricated parts, the densities are 98.12% and 99.02%, respectively, and the mechanical properties at room temperature are 751 MPa and 916 MPa.

Figure 7:
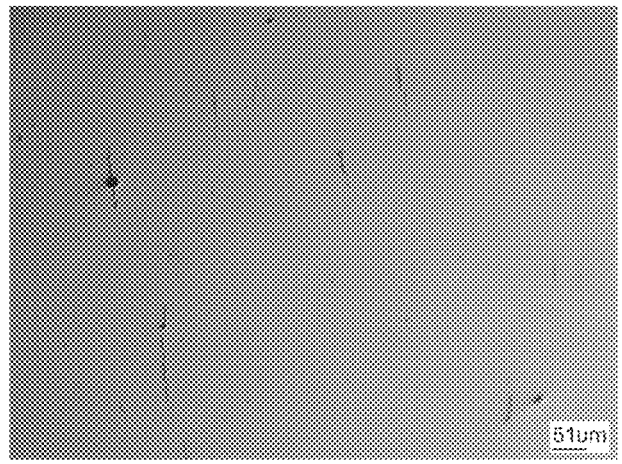
FIG. 7 shows the crack morphology in an SLM-fabricated René 104 alloy in Comparative Example 1.
Figure 8:
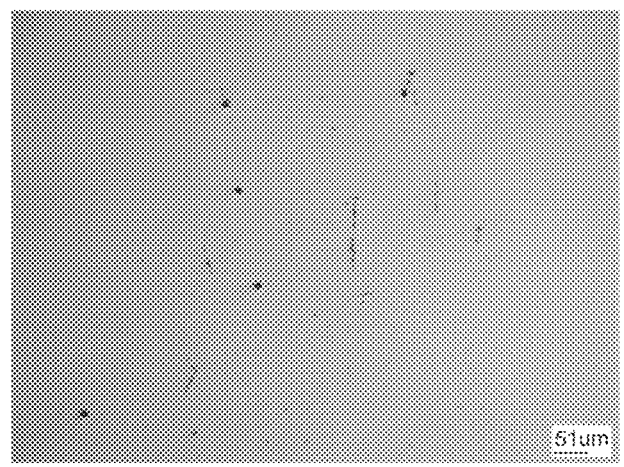
FIG. 8 shows the crack morphology in the SLM-fabricated René 104 alloy after post-treatments in Comparative Example 1.

The results shown in FIG. 7 show that large and small cracks exist in the fabricated parts. The results shown in FIG. 8 indicate that there are still some cracks in the post-treated fabricated parts.

Comparative Example 2

3D design software and 3D drawing software were used to construct a 3D cylinder model with a diameter of 40 mm and a height of 15 mm, which was converted into an STL file and imported into SLM building software. The model was auto-sliced by the software and imported into an SLM printing system. After heating the substrate to 150° C., the René 104 nickel-based superalloy powder was added to a powder supply tank and then laid. Argon was introduced into the working chamber until the oxygen content was less than 0.1%. Then the printing procedure was carried out, and the steps of laying the powder and scanning the powder by laser were repeated until the printing was completed to obtain a cylinder.

The René 104 nickel-based superalloy powder has a particle size of 15-53 μm, a $D_{10}$ of 17.5 μm, a $D_{50}$ of 29.3 μm, and a $D_{90}$ of 46.9 μm.

The process parameters for SLM are as follows: a laser power of 420 W, a spot diameter of 0.12 mm, a scanning speed of 800 mm/s, a scanning pitch of 0.12 mm, and a thickness of the laid powder layer being 0.03 mm.

The scanning strategy for SLM is a stripe scanning strategy, as shown in FIG. 1. In the stripe scanning strategy, a layer-by-layer scanning method from bottom to top is adopted, the laser scanning direction is rotated by 67° between adjacent layers, the stripe width is 7 mm, and the overlap between stripes is 0.11 mm, to reduce the superimposition of residual stress during the printing process. (The contour+solid scanning method is not adopted, and the laser power is too high)

The stress relief annealing parameters are as follows: a temperature of 420° C. held for 90 min, and cooling within the furnace.

The SPS parameters are as follows: a graphite mold with a diameter of 40 mm, a heating rate of 60° C./min, a cooling rate of 60° C./min, a sintering pressure of 45 MPa, and a sintering temperature of 1020° C. held for 15 min.

Before and after post-treatments of the fabricated parts, the densities are 97.89% and 98.38%, respectively, and the mechanical properties at room temperature are 645 MPa and 901 MPa.

Comparative Example 3

3D design software and 3D drawing software were used to construct a 3D cylinder model with a diameter of 40 mm and a height of 15 mm, which was converted into an STL file and imported into SLM building software. The model was auto-sliced by the software and imported into an SLM printing system. After heating the substrate to 150° C., the René 104 nickel-based superalloy powder was added to a powder supply tank and then laid. Argon was introduced into the working chamber until the oxygen content was less than 0.1%. Then the printing procedure was carried out, and the steps of laying the powder and scanning the powder by laser were repeated until the printing was completed to obtain a cylinder.

The René 104 nickel-based superalloy powder has a particle size of 0-53 μm, a $D_{10}$ of 10.3 μm, a $D_{50}$ of 23.7 μm, and a $D_{90}$ of 35.5 μm.

The process parameters for SLM are as follows: a laser power of 250 W, a spot diameter of 0.12 mm, a scanning speed of 500 mm/s, a scanning pitch of 0.12 mm, and a thickness of the laid powder layer being 0.03 mm.

The scanning strategy for SLM is a stripe scanning strategy. In the stripe scanning strategy, a layer-by-layer scanning method from bottom to top is adopted, the laser scanning direction is rotated by 67° between adjacent layers, the stripe width is 7 mm, and the overlap between stripes is 0.11 mm, to reduce the superimposition of residual stress during the printing process. (The contour+solid scanning method is not adopted)

The stress relief annealing parameters are as follows: a temperature of 420° C. held for 90 min, and cooling within the furnace.

The SPS parameters are as follows: a graphite mold with a diameter of 40 mm, a heating rate of 60° C./min, a cooling rate of 60° C./min, a sintering pressure of 45 MPa, and a sintering temperature of 1020° C. held for 15 min.

Before and after post-treatments of the fabricated parts, the densities are 98.03% and 98.45%, respectively, and the mechanical properties at room temperature are 725 MPa and 921 MPa.

Comparative Example 4

3D design software and 3D drawing software were used to construct a 3D cylinder model with a diameter of 40 mm and a height of 15 mm, which was converted into an STL file and imported into SLM building software. The model was auto-sliced by the software and imported into an SLM printing system. After heating the substrate to 150° C., the René 104 nickel-based superalloy powder was added to a powder supply tank and then laid. Argon was introduced into the working chamber until the oxygen content was less than 0.1%. Then the printing procedure was carried out, and the steps of laying the powder and scanning the powder by laser were repeated until the printing was completed to obtain a cylinder.

The René 104 nickel-based superalloy powder has a particle size of 15-53 μm, a $D_{10}$ of 17.5 μm, a $D_{50}$ of 29.3 μm, and a $D_{90}$ of 46.9 μm.

The process parameters for SLM are as follows: a laser power of 250 W, a spot diameter of 0.12 mm, a scanning speed of 500 mm/s, a scanning pitch of 0.12 mm, and a thickness of the laid powder layer being 0.03 mm.

The scanning strategy for SLM is a stripe scanning strategy. In the stripe scanning strategy, a layer-by-layer scanning method from bottom to top is adopted, the laser scanning direction is rotated by 67° between adjacent layers, the stripe width is 5 mm, and the overlap between stripes is 0.10 mm. (no contour+solid scanning method is adopted)

The stress relief annealing parameters are as follows: a temperature of 420° C. held for 90 min, and cooling within the furnace.

The SPS parameters are as follows: a graphite mold with a diameter of 40 mm, a heating rate of 60° C./min, a cooling rate of 60° C./min, a sintering pressure of 45 MPa, and a sintering temperature of 1020° C. held for 15 min.

Before and after post-treatments of the fabricated parts, the densities are 98.34% and 99.02%, respectively, and the mechanical properties at room temperature are 987 MPa and 1065 MPa.

Comparative Example 5

3D design software and 3D drawing software were used to construct a 3D cylinder model with a diameter of 40 mm and a height of 15 mm, which was converted into an STL file and imported into SLM building software. The model was auto-sliced by the software and imported into an SLM printing system. After heating the substrate to 150° C., the René 104 nickel-based superalloy powder was added to a powder supply tank and then laid. Argon was introduced into the working chamber until the oxygen content was less than 0.1%. Then the printing procedure was carried out, and the steps of laying the powder and scanning the powder by laser were repeated until the printing was completed to obtain a cylinder.

The René 104 nickel-based superalloy powder has a particle size of 15-53 μm, a $D_{10}$ of 17.5 μm, a $D_{50}$ of 29.3 μm, and a $D_{90}$ of 46.9 μm.

The process parameters for SLM are as follows: a laser power of 225 W, a spot diameter of 0.12 mm, a scanning speed of 600 mm/s, a scanning pitch of 0.11 mm, and a thickness of the laid powder layer being 0.03 mm.

The scanning strategy for SLM is a chessboard scanning strategy. In the chessboard scanning strategy, a layer-by-layer scanning method from bottom to top is adopted, the laser scanning direction is rotated by 67° between adjacent layers, the grid size of the chessboard is 10 mm, the spacing between chessboard grids is 0.13 mm, and the laser scanning directions of adjacent chessboard grids are perpendicular to each other. (The contour+solid scanning method is not adopted)

The stress relief annealing parameters are as follows: a temperature of 420° C. held for 90 min, and cooling within the furnace.

The SPS parameters are as follows: a graphite mold with a diameter of 40 mm, a heating rate of 60° C./min, a cooling rate of 60° C./min, a sintering pressure of 45 MPa, and a sintering temperature of 1020° C. held for 15 min.

Before and after post-treatments of the fabricated parts, the densities are 98.01% and 98.55%, respectively, and the mechanical properties at room temperature are 723 MPa and 912 MPa.

Comparative Example 6

3D design software and 3D drawing software were used to construct a 3D cylinder model with a diameter of 40 mm and a height of 15 mm, which was converted into an STL file and imported into SLM building software. The model was auto-sliced by the software and imported into an SLM printing system. After heating the substrate to 150° C., the René 104 nickel-based superalloy powder was added to a powder supply tank and then laid. Argon was introduced into the working chamber until the oxygen content was less than 0.1%. Then the printing procedure was carried out, and the steps of laying the powder and scanning the powder by laser were repeated until the printing was completed to obtain a cylinder.

The René 104 nickel-based superalloy powder has a particle size of 15-53 μm, a $D_{10}$ of 17.5 μm, a $D_{50}$ of 29.3 μm, and a $D_{90}$ of 46.9 μm.

The process parameters for SLM are as follows: a laser power of 250 W, a spot diameter of 0.12 mm, a scanning speed of 500 mm/s, a scanning pitch of 0.12 mm, and a thickness of the laid powder layer being 0.03 mm.

The scanning strategy for SLM is a stripe scanning strategy. In the stripe scanning strategy, a layer-by-layer scanning method from bottom to top is adopted, the laser scanning directions of adjacent layers are rotated by 67°, the stripe width is 7 mm, and the overlap between stripes is 0.11 mm. (The contour+solid scanning method is not adopted)

The SPS parameters are as follows: a graphite mold with a diameter of 40 mm, a heating rate of 60° C./min, a cooling rate of 60° C./min, a sintering pressure of 45 MPa, and a sintering temperature of 1020° C. held for 15 min.

Before and after post-treatments of the fabricated parts, the densities are 99.18% and 99.54%, respectively, and the mechanical properties at room temperature are 987 MPa and 1156 MPa.

Comparative Example 7

3D design software and 3D drawing software were used to construct a 3D cylinder model with a diameter of 40 mm and a height of 15 mm, which was converted into an STL file and imported into SLM building software. The model was auto-sliced by the software and imported into an SLM printing system. After heating the substrate to 150° C., the René 104 nickel-based superalloy powder was added to a powder supply tank and then laid. Argon was introduced into the working chamber until the oxygen content was less than 0.1%. Then the printing procedure was carried out, and the steps of laying the powder and scanning the powder by laser were repeated until the printing was completed to obtain a cylinder.

The René 104 nickel-based superalloy powder has a particle size of 15-53 μm, a $D_{10}$ of 17.5 μm, a $D_{50}$ of 29.3 μm, and a $D_{90}$ of 46.9 μm.

The process parameters for SLM are as follows: a laser power of 250 W, a spot diameter of 0.12 mm, a scanning speed of 500 mm/s, a scanning pitch of 0.12 mm, and a thickness of the laid powder layer being 0.03 mm.

The scanning strategy for SLM is a stripe scanning strategy. In the stripe scanning strategy, a layer-by-layer scanning method from bottom to top is adopted, the laser scanning direction is rotated by 67° between adjacent layers, the stripe width is 7 mm, and the overlap between stripes is 0.11 mm, to reduce the superimposition of residual stress during the printing process. (The contour+solid scanning method is not adopted)

The stress relief annealing parameters are as follows: a temperature of 1000° C. held for 90 min, and cooling within the furnace.

The SPS parameters are as follows: a graphite mold with a diameter of 40 mm, a heating rate of 60° C./min, a cooling rate of 60° C./min, a sintering pressure of 45 MPa, and a sintering temperature of 1020° C. held for 15 min.

Before and after post-treatments of the fabricated parts, the densities are 99.18% and 99.55%, respectively, and the mechanical properties at room temperature are 987 MPa and 1033 MPa.

Comparative Example 8

3D design software and 3D drawing software were used to construct a 3D cylinder model with a diameter of 40 mm and a height of 15 mm, which was converted into an STL file and imported into SLM building software. The model was auto-sliced by the software and imported into an SLM printing system. After heating the substrate to 150° C., the René 104 nickel-based superalloy powder was added to a powder supply tank and then laid. Argon was introduced into the working chamber until the oxygen content was less than 0.1%. Then the printing procedure was carried out, and the steps of laying the powder and scanning the powder by laser were repeated until the printing was completed to obtain a cylinder.

The René 104 nickel-based superalloy powder has a particle size of 15-53 μm, a $D_{10}$ of 17.5 μm, a $D_{50}$ of 29.3 μm, and a $D_{90}$ of 46.9 μm.

The process parameters for SLM are as follows: a laser power of 250 W, a spot diameter of 0.12 mm, a scanning speed of 500 mm/s, a scanning pitch of 0.12 mm, and a thickness of the laid powder layer being 0.03 mm.

The scanning strategy for SLM is a stripe scanning strategy. In the stripe scanning strategy, a layer-by-layer scanning method from bottom to top is adopted, the laser scanning direction is rotated by 67° between adjacent layers, the stripe width is 7 mm, and the overlap between stripes is 0.11 mm, to reduce the superimposition of residual stress during the printing process.

The stress relief annealing parameters are as follows: a temperature of 420° C. held for 90 min, and cooling within the furnace.

The SPS parameters are as follows: a graphite mold with a diameter of 40 mm, a heating rate of 60° C./min, a cooling rate of 60° C./min, a sintering pressure of 45 MPa, and a sintering temperature of 1120° C. held for 15 min.

Before and after post-treatments of the fabricated parts, the densities are 99.18% and 99.60%, respectively, and the mechanical properties at room temperature are 987 MPa and 1076 MPa.

Sintering at 1120° C. for a short period of time of 60 s is also tested by the present inventors during SPS, but the performance of the resulting product is undesirable.

It can be seen from the examples and the comparative examples that the present disclosure can obtain a product with excellent performance only through the collaboration of various condition parameters and processes. When one or more of the implementation steps or the implementation condition parameters go beyond the protection scope claimed by the present disclosure, the performance of the product is much lower than that of the present disclosure.

What is claimed is:

1. A method for eliminating cracks in René 104 nickel-based superalloy prepared by laser additive manufacturing, wherein the method comprising the following steps:

Step 1: preparation before the laser additive manufacturing, comprising

According to a shape of a required part, designing a three-dimensional model of the part by using a three-dimensional design software, and then importing the three-dimensional design model into the laser additive manufacturing equipment; and after auto-slicing by the software, importing data of each slice layer into the laser additive manufacturing system;

Step 2: additive manufacturing by selective laser melting, comprising

Laying the René 104 nickel-based superalloy powder, then using a laser to selectively melt the powder bed according to information of the slice layer, wherein scanning methods include a contour scanning and a solid scanning, and for scanning of each layer, the contour scanning is carried out first, then the solid scanning is carried out, where the solid scanning adopts a partition scanning strategy, and then contour scanning is carried out again; the whole step consists of powder laying and laser melting processing;

The René 104 nickel-based superalloy powder has a particle size of 15-53 μm, a $D_{10}$ of 15-20 μm, a $D_{50}$ of 25-31 μm, and a $D_{90}$ of 40-48 μm;

Where the parameters of the contour scanning are as follows: a laser spot diameter of 0.08-0.1 mm, a laser power of 100 W-150 W, and a scanning speed of 1000-1400 mm/s;

Where the parameters of the solid scanning are as follows: a laser power of 200 W-250 W, a laser spot diameter of 0.10-0.13 mm, a scanning speed of 450-650 mm/s, a scanning pitch of 0.08-0.14 mm, and a thickness of the laid powder layer being 30-35 μm; and The partition scanning strategy is as follows: dividing a solid area of each slice layer into multiple zones, and then scanning and melting every zone by the laser in turn; and the partition scanning strategy includes a stripe scanning strategy and/or a chessboard scanning strategy;

Where the parameters for the stripe scanning strategy are as follows: a stripe width of 6-8 mm, and an overlap between stripes being 0.1-0.15 mm; and Where the parameters for the chessboard scanning strategy are as follows: a chessboard size of 4-6 mm, an overlap between chessboards being 0.08-0.12 mm, and laser scanning directions of adjacent chessboards being perpendicular to each other;

Step 3: repeating step 2 until the whole part is printed on a substrate, and then separating the printed part from the substrate to obtain a fabricated part;

Step 4: heat-treating the fabricated part by a stress relief annealing at a temperature of $(0.3-0.4)*T_{re}°$ C. for a time of 1-3 hrs; and Step 5: spark plasma sintering the fabricated part heat-treated by the stress relief annealing at a temperature of $(0.8-0.9)*T_{re}°$ C. for a time of 10-20 min, Where the $T_{re}$ is the recrystallization temperature of the alloy, expressed in ° C.

2. The method for eliminating cracks in René 104 nickel-based superalloy prepared by laser additive manufacturing according to claim 1, wherein the René 104 nickel-based superalloy contains Al and Ti, and Al+Ti is present in an amount of 5 wt. % or more based on the total weight of the René 104 nickel-based superalloy.

3. The method for eliminating cracks in René 104 nickel-based superalloy prepared by laser additive manufacturing according to claim 1, wherein the substrate for printing is a stainless steel substrate or the same type of nickel-based superalloy; and the substrate is preheated to a temperature of 100-200° C. before printing.

4. The method for eliminating cracks in René 104 nickel-based superalloy prepared by laser additive manufacturing according to claim 1, wherein during the laser additive manufacturing process, inert protective gas such as argon or nitrogen needs to be introduced into the working chamber of the equipment to ensure an oxygen content in the working chamber less than 0.1%.

5. The method for eliminating cracks in René 104 nickel-based superalloy prepared by laser additive manufacturing according to claim 1, wherein the stress relief annealing is carried out under a protective gas atmosphere; during the stress relief annealing, the temperature is raised to an annealing temperature at a heating rate of 5-15° C./min, and held for 1-3 hrs; and then the alloy is cooled within the furnace.

6. The method for eliminating cracks in René 104 nickel-based superalloy prepared by laser additive manufacturing according to claim 5, wherein during the stress relief annealing, the protective gas atmosphere is selected from at least one of argon and nitrogen.

7. The method for eliminating cracks in René 104 nickel-based superalloy prepared by laser additive manufacturing according to claim 1, wherein during spark plasma sintering, the heating rate is controlled to 50-100° C./min, and the cooling rate is controlled to 50-100° C./min.

8. The method for eliminating cracks in René 104 nickel-based superalloy prepared by laser additive manufacturing according to claim 1, wherein during spark plasma sintering, a pressure is controlled to 30-50 MPa.

9. The method for eliminating cracks in René 104 nickel-based superalloy prepared by laser additive manufacturing according to claim 1, wherein during spark plasma sintering, a sintering temperature is controlled to 1020° C. or less.

10. The method for eliminating cracks in René 104 nickel-based superalloy prepared by laser additive manufacturing according to claim 1, wherein after treatments of the stress relief annealing and the spark plasma sintering in turn, a tensile strength of the René 104 nickel-based superalloy is 1.6-2.0 times of that before the treatments.

\* \* \* \* \*